United States Patent

[11] 3,588,386

[72] Inventor Johannes Draayer
Wheaton, Ill.

[21] Appl. No. 846,008
[22] Filed July 30, 1969
[45] Patented June 28, 1971
[73] Assignee GTE Automatic Electric Laboratories, Incorporated

[54] COMMUNICATION MATRIX TESTING ARRANGEMENT
11 Claims, 3 Drawing Figs.

[52] U.S. Cl. .......... 179/175.21
[51] Int. Cl. .......... H04m 3/10
[50] Field of Search .......... 179/175.21, 175.23; 340/176

[56] References Cited
UNITED STATES PATENTS
3,184,710 5/1965 Martens .......... 179/175.21

*Primary Examiner*—Kathleen H. Claffy
*Assistant Examiner*—Douglas W. Olms
*Attorneys*—Cyril A. Krenzer, K. Mullerheim and B. E. Franz

ABSTRACT: A multistage cross-point switching network is disclosed for use in a program controlled communication switching system. The equipment includes ferrod and relay line scan circuitry for performing the conventional telephone functions as well as matrix testing under control of a central processor. The matrix tests involve a routine program and two network connections, one of which is connected to a trunk battery feed and the other one is connected to the ferrod scanner that has the battery feed reversed. This arrangement causes the ferrod associated with the second network connection to operate in response to a single contact between the two paths being stuck, due to the opposite polarities at the two ends, after which a normal scanner operation detects this operated ferrod and informs the common control of the identity.

INVENTOR
JOHANNES DRAAYER
BY Bernard E. Franz
ATTORNEY

COMMUNICATION MATRIX TESTING ARRANGEMENT

BACKGROUND OF THE INVENTION

1. Field of the Invention

This invention relates to testing systems, and particularly to equipment utilized in switching systems for automatically testing matrices for undesired cross connections.

2. Description of the Prior Art

As is known, relay cross-point switching systems employ switches, each made up of a coordinate array of relay contact sets. The cross-point switching contacts used in certain of these matrices are reed relays, wherein the contacts are sealed in glass containers and the relay winding is wound around all the envelopes of the contacts comprising the relay. Though providing many improved properties the present day reed capsules are occasionally subject to the sticking together of their reed blades after the applied flux has been removed. This sticking may be due to pitting, welding, or the presence of impurities or an undesired magnetic field. Sticking of a single cross-point contact in the audio path of a switching network may result in a cross connection between two existing connections. Detection, and if possible localization of such a failure is highly desirable. To date the only method available to detect and localize such stuck contacts was through the use of additional testing equipment or processes.

It is therefore a general object of the present invention to provide an apparatus for detecting stuck closed contacts in a switching matrix.

Another object of the present invention is to provide an apparatus for detecting stuck closed contacts in a switching matrix by utilizing only the existing components of the telephone system.

SUMMARY OF THE INVENTION

According to the invention, the facilities include a specially wired line sensor in each line circuit, with the sensors being responsive to either a conventional telephone call initiation or a stuck reed switch during a test scan program operation.

Each line sensor is arranged to have the battery and ground potentials reversed to its windings, relative to the normal battery feed polarity, during the scanning of the line terminals for stuck contacts in the matrices.

The test for stuck contacts is performed by setting up a first path through the entire switching matrix, from a particular line terminal of the matrix input to a trunk terminal of the matrix output. The trunk terminal is connected to the trunk circuit which supplies the talking path conductors with conventionally polarized battery potentials. The line sensor associated with this first connection is disconnected in the normal manner by the operation of the cutoff relay in the line circuit.

A second parallel connection is also set up using at least one of the same matrices used in the first connection. This second path remains connected to the line sensor which, having its battery polarity reversed, feeds the talking path conductors with a polarity that is the inverse of that fed by the trunk circuit in the first connection.

It should be understood that a stuck contact will only produce a cross connection between similar leads in adjacent paths, for example, from the tip conductor of one path to the tip conductor of another path. Therefore, should a stuck contact exist in a cross-point of a matrix sharing one of the inputs or outputs, an electrical current will flow from the one polarity in the trunk circuit to the opposite polarity in the ferrod. The ferrod will then be operated to the same state as for a line call for service, which state is then readily detectable by the line scanner. The line scanner detecting this condition of a line scan point, forwards the appropriate identity data to the common control, where, with the information there registered of the cross-points used in each path, the position of a stuck contact is determined. The path connections set up for the test are released and other path connections are set up. This would normally be continued until all possible cross-connection paths were tested. The subsequent actions are, of course, determined by operating practices which may include the programming of the common control to avoid the cross-points involved and the printing out of the data relative to their location.

BRIEF DESCRIPTION OF THE DRAWINGS

These and other objects and features along with the attendant advantages, and uses will become more apparent to those skilled in the art from the following detailed description of a specific embodiment thereof when read in conjunction with the accompanying drawings in which.

DETAILED DESCRIPTION

Figure 2:
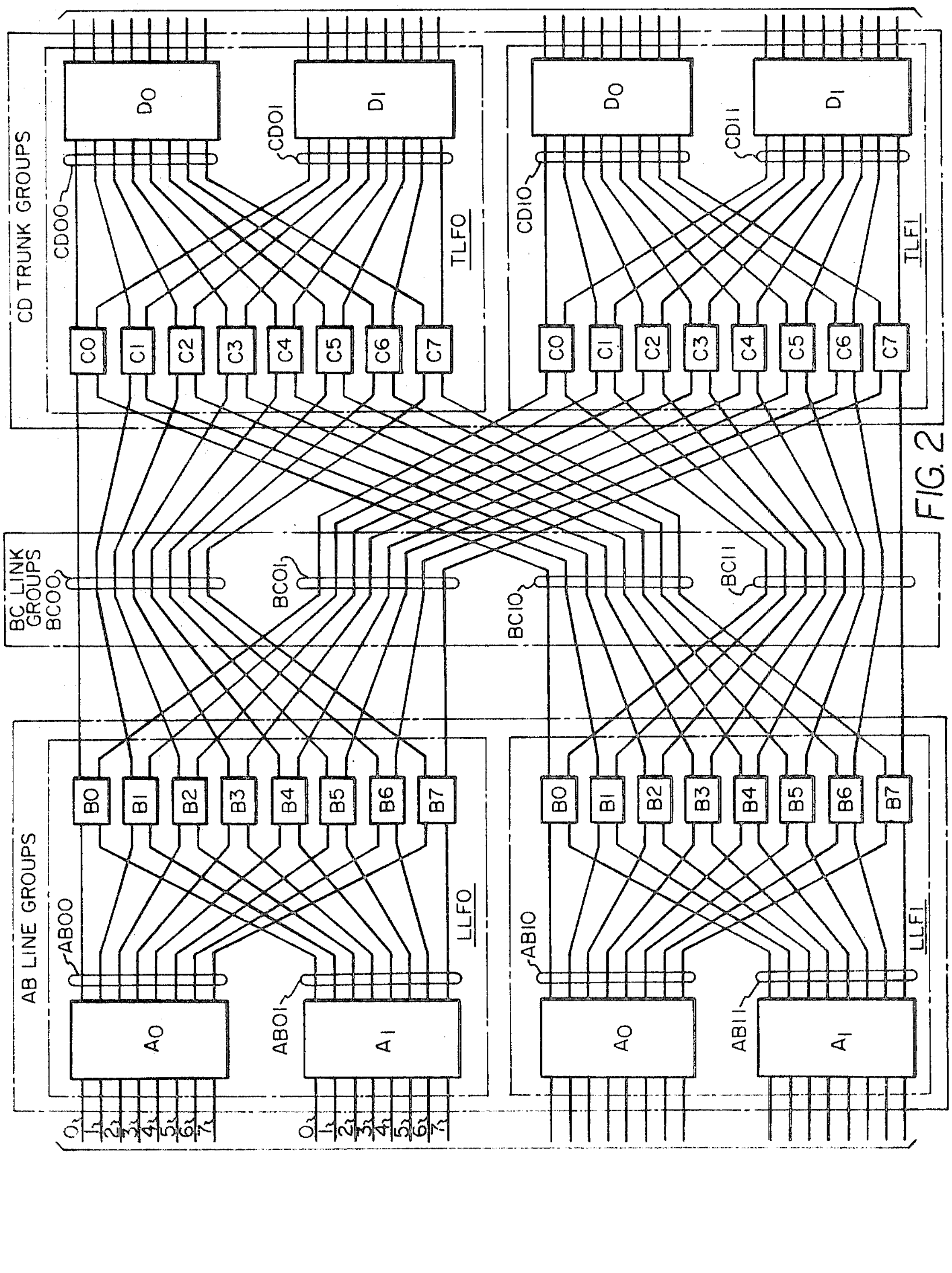
FIG. 2 is a diagram of a switching matrix network which may be employed in the system of the invention.

For the particular illustrative embodiment of the invention described hereinafter, a four-stage network is chosen, as depicted in FIG. 2.

The four stages of the network are referred to as the A, B, C, and D stages and are implemented with reed relay cross-point matrices. Each stage is made up of a coordinate array of relay contact sets of which there is one such contact set at each cross-point between a plurality of vertical multiples and a plurality of horizontal multiples, each such multiple comprising a number of conductors according to the number of physical connections required to be established through the array for a single communication path set up through it. For instance in a telephone exchange each multiple may comprise conductors corresponding to the tip and ring wires of a subscriber's line together with other conductors affording control connections required for holding purposes. By convention the tip side of a subscriber line is the positive (+) conductor and the ring side of the line is the negative (−) conductor. Each contact set is controlled by a single relay.

By selective operation of the relays a communication path can be established between the line terminals which are connected to horizontal or vertical multiples of the switching arrays in the first switching stage through the switching stages and the links between them to the trunk terminals in the last of the switching stages concerned.

The four stages of the network are grouped functionally as the line-link frame and the trunk-link frame. The line-link frame contains the A and B stages, while the trunk-link frame contains the C and D stages.

The adjacent stages are interconnected by multiconductor paths called links, which extend between the multiples of the switching arrays of one stage and the switching arrays of the next stage.

The line-link frame and the trunk-link frame are interconnected by groups of links called the BC link groups which are identified by the code combination of the line-link frame and trunk-link frame with which they are associated. The links of the BC link group must connect the B matrices of each line-link frame to the C matrices of each trunk-link frame. Reference to FIG. 2 will show that each B matrix has as many outlets as there are trunk-link frames and that each C matrix has as many inlets as there are line-link frames. Each line-link frame contains the A matrices and the B matrices. The outlets of the A matrices must be connected to the inputs of the B matrices. The AB link groups are identified by the line-link frame and A matrix address combination. For example, AB link group 10 establishes connections between A matrix 0 of line-link frame 1 and the B matrices within line-link frame 1. Each trunk-link frame has the inlets of the D matrices connected to the C matrices' outlets by CD link groups. The CD link group is accordingly identified by the trunk-link frame and the D matrix address combination. A marker pathfinder system utilizing a four stage network of this type is disclosed in greater detail in U.S. Pat No. 3,349,189 to John G. Van Bosse.

Figures 1, 3:
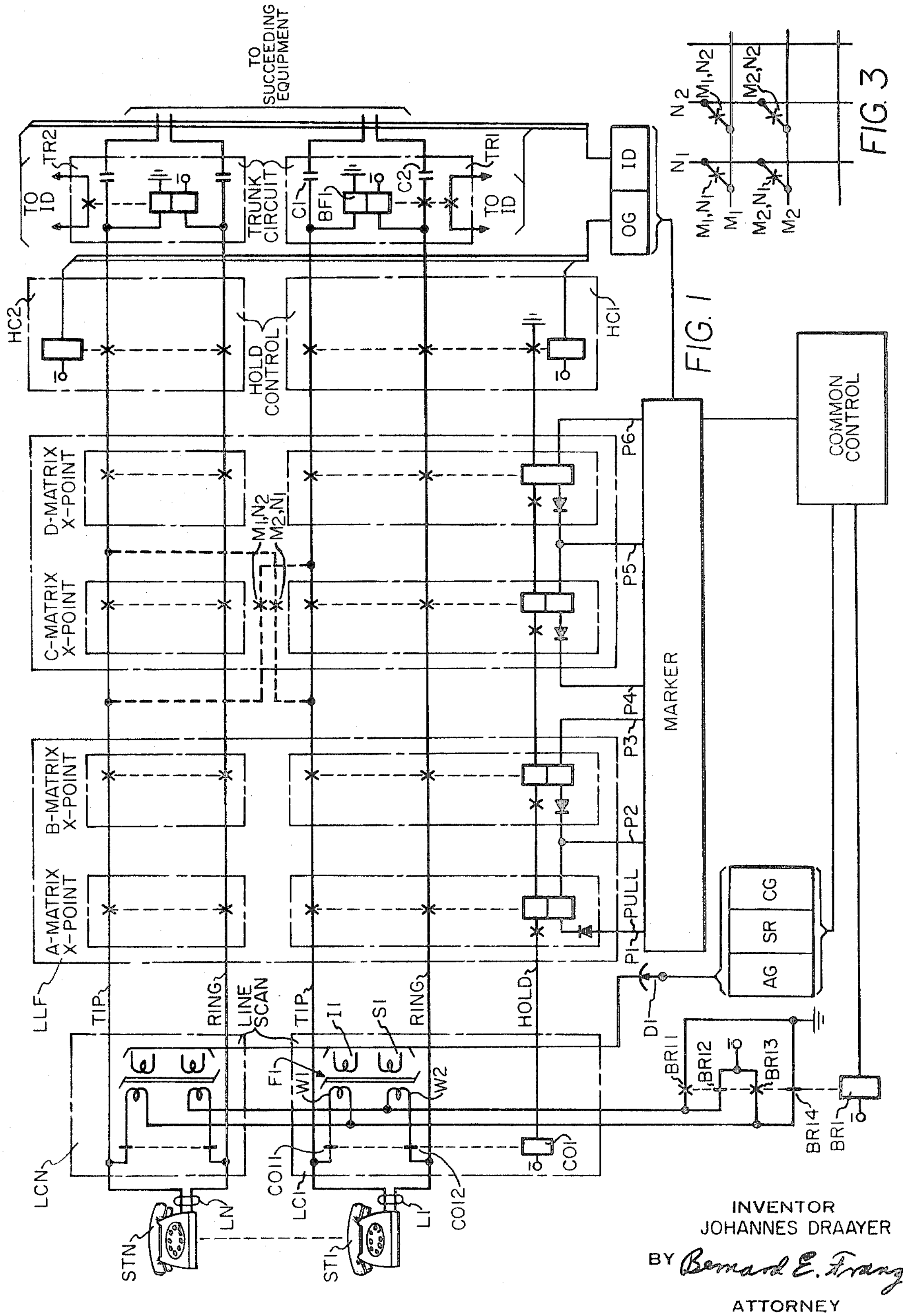
FIG. 1 is a diagram of two paths through the network with an assumed cross connection shown by dotted lines.
FIG. 3 is a detail illustration of a matrix.

Referring to FIG. 1 the telephone stations ST1 through STN of the exchange are connected to the switching office over telephone lines L1 through LN, and are terminated there in both a line-link network LLF and in line circuits LC1 through LCN.

Each line circuit such as for example LC1 consists of a ferrod sensing element F1 and a cutoff relay CO1. The ferrod sensing element comprises a stick of ferrite material having control windings W1 and W2, an interrogate winding I1 and a sense winding S1, wound on it. A complete description of ferrod elements suitable for application here is disclosed in U.S. Pat. No. 3,254,157 issued to A. M. Guercio and H. F. May; and application Ser. No. 545,451 of F. A. Risky filed Apr. 26, 1966 and J. G. Van Bosse, application Ser. No. 523,365 filed Jan. 27, 1966.

The line L1 tip conductor is connected in the conventional manner through cutoff relay contact CO11 and control winding W1 to ground potential through contacts BR14, the ring conductor is connected through cutoff relay contacts CO12 and control winding W2 to battery potential through contacts BR12.

The control windings are so connected that when a current path is completed by the telephone station being placed in the off-hook state, the current in these windings produces mutually aiding fluxes in the longitudinal direction of the element. The ferrite stick F1 serves as a magnetic coupling medium for the interrogate I1 and the sense S1 windings, and depending upon whether or not a predetermined amount of current is flowing in the control windings, the element is either saturated or unsaturated. When the line is idle the ferrod is unsaturated so that a pulse in the interrogate winding is coupled into the sense winding. When the line is off-hook the ferrod is saturated and a pulse in the interrogate winding will not be coupled to the sense winding.

The interrogate and sense windings of every line circuit ferrod are connected through a scanning distributor D1 operating in synchronism with an address generator, AG, to connect a current generator, CG, to the interrogate winding and a sense register SR to the sense winding. The lines are interrogated in response to commands from the common control and the results of the interrogation are returned to the common control. A complete description of a scanning system suitable for application here is disclosed in application Ser. No. 667,791 filed Sept. 14, 1967, of Frank A. Risky.

The "Common Control" shown at the bottom of FIG. 1 may be of the type disclosed in The Bell System Technical Journal, Sept. 1964, Vol. XLIII, No. 5, Parts 1 and 2. It is a centralized data processing machine that is employed to implement the various control functions of the system. It includes: the usual semipermanent memory for storing information pertaining to the calls and other operations of the system in progress, including the data relative to addresses of the lines and the switches of the matrix used in each call; a permanent memory for storing the system operating programs and other less changeable data; and a logic or control unit for processing the instructions required for controlling the peripheral equipment, including the line scanners and the network control equipment designated as "marker" in the drawing.

In FIG. 1 a cross-point from each of the A, B, C and D matrices is shown for two paths through the network from each of the telephones L1 and LN to the trunk circuit TR1 and to the hold control HC2 respectively. The cross-points shown for telephone ST1 include operate magnets and control conductors as well as the talking pair of conductors. The magnets have two windings, a pull winding operated from the marker to set up a path as directed by the common control, and a hold winding that is used to hold the connection via a series path from the line circuit, through each of the cross-point hold magnet windings and contacts to the hold control relay at the trunk end. The trunk control consists of a relay operated from the marker to extend the talking pair of conductors TIP and RING through to the trunk circuit TR1 and apply a holding potential to the matrix.

The talking conductors TIP and RING terminate in the trunk circuit battery feed relay BF1 for the direct current path, and at the coupling capacitors C1 and C2 for the audio path where through succeeding equipment the path is completed to other subscriber telephones or to required message processing equipment.

In order to perform the test of audio contacts for a stuck closed failure condition the voltage polarity of the input detector as seen from the line side of the network is reversed with respect to the polarity of the battery voltage placed upon the line by the trunk circuit. This reversal of voltages is caused by the common control when it is operating to perform the stuck closed contact tests by the operation of relay BR1. The operation of this relay will not interfere with the normal call processing since the line scanner ferrods will respond to off-hook conditions regardless of the polarity supplied to them. In some instances it may even be possible to have the ferrods wired with this "reversed" polarity permanently, without ill effects upon the system operation. Or the relay such as BR1 may be omitted from an actual permanent installation, and the battery to the ferrods reversed by installation personnel when a stuck closed contact test is required.

The path for ST1 represents the audio pair circuit of a network connection which is in a hold condition while the path for STN represents another network connection which has had its cross-points "pulled-up" but not locked to a hold state. The matrix shown in FIG. 3 represents one-half of the talking path contacts, for example, the tip contacts of the C matrix of FIG. 1 in greater detail. Assuming it contains M inlets and N outlets then, the cross-points at matrix coordinates $M_1$, $N_1$ and $M_2$, $N_2$ are used to form the paths for ST1 and STN respectively. For this test it is required that $M_1 \neq M_2$ and $N_1 \neq N_2$, and that the line subscriber stations be "on hook." If either of the cross-point contacts at matrix coordinates $M_2N_1$ or $M_1N_2$ is stuck closed a cross connection will exist as shown in the path illustrations in FIG. 1 and a current path will be established from the trunk circuit relay to the line scan point.

Both devices, the line scan point and the trunk circuit relay, will become energized through one-half of their windings and the resulting output states can be monitored by the line scanner and the trunk scanner ID respectively.

By applying an appropriate test routine it is possible to localize a stuck closed audio contact to within two cross-point locations.

From the foregoing, it will be apparent that applicant's arrangement; of setting up two parallel connections through a switching matrix, with the polarity of the potentials on one path reversed with respect of those in the other path, presents a very effective and efficient arrangement for the detection of defective cross-points in the switch matrix. It does not require any special test equipment and may be performed by the common control equipment of the exchange.

Various changes and alternative implementations will now occur to those skilled in the art without departing from the spirit and scope of the invention.

I claim:

1. In a system comprising a cross-point switching matrix, control means comprising means for operating a first cross-point of said matrix to establish a first input-terminal-to-output-terminal connection through the matrix, and for thereafter operating a second cross-point of said matrix to establish a second input-terminal-to-output-terminal connection through the matrix, first battery supply means operated to supply operating potential to said first connection and other means to supply an inverse operating potential to said second connection, and means for detecting current flow in said first connection, whereby cross connections may be detected.

2. The combination according to claim 1, wherein said other means to supply an inverse operating potential to said second connection includes a ferrod scan point having a control winding in series with said connection.

3. The combination according to claim 2, wherein said means for detecting a current flow includes a scanner and detector register connected to said ferrod scan point.

4. The combination according to claim 3, wherein said first battery supply means includes a battery feed relay having a winding in series with said connection through said matrix.

5. In a system comprising switching apparatus arranged in a multistage network, control means comprising means for operating the switching apparatus to establish a plurality of parallel input-terminal-to-output-terminal metallic communication connections through said network, other means operated to supply first potentials to a first one of said plurality of metallic communication connections, still other means to supply second potentials to a second one of said plurality of metallic communication connections, and means for detecting a current flow in said metallic communication connections, whereby cross connections may be detected.

6. The combination according to claim 5, wherein said other means to supply an inverse operating potential to said second connection includes a ferrod scan point having a control winding in series with said connection.

7. The combination according to claim 6, wherein said means for detecting a current flow includes a scanner and detector register connected to said ferrod scan point.

8. The combination according to claim 7, wherein said other means operated to supply a first potential includes a battery feed relay having a winding in series with said metallic communication connection.

9. In a system comprising a switching apparatus arranged in a multistage network, control means comprising means for operating the switching apparatus to establish a plurality of parallel input-terminal-to-output-terminal metallic connections through the network, first battery supply means operated to supply operating potential to a first one of said plurality of metallic communication connections, second battery supply means operated to supply operating potentials to a second one of said plurality of metallic communication connections, reversing means operated to reverse the operating potentials to said second battery supply means, and means for detecting current flow in said metallic communication connection, whereby cross connections may be detected.

10. The combination according to claim 9, wherein said means to supply a second potential includes a ferrod scan point having a control winding in series with said metallic communication connection.

11. A program controlled common control telephone system comprising a plurality of telephone lines, a plurality of trunks each including a battery feed device connectable to the talking conductors upon connection thereto, link connector means operable for establishing connections between said lines and said trunks comprising; a switching network having a plurality of line terminals, a plurality of trunk terminals, a plurality of successive groups of switching matrices, each switching matrix including a plurality of switch means, a plurality of links between said terminals and said groups of matrices, whereby a plurality of multiconductor channels extend between each said line terminal and each said trunk terminal, each said channel including a separate switch means from a matrix of each group and a separate link between each successive matrix; marker means operated by said common control means to set up a path through said successive switch means between said line terminal and said trunk terminal; a line scanner having an individual ferrod associated with each of said lines for sensing a predetermined condition on said associated lines, each said ferrod comprising a saturable core with a first and a second battery feed winding connected from a first and second conventionally polarized source of potential to said talking conductors; and a matrix stuck contact testing means comprising: polarity reversing apparatus operative to reverse the battery feed to said ferrod sensors, said common control means having stored program instructions and means responsive to said instructions for operating said polarity reversing apparatus; and other means responsive to other of said program instructions for controlling the operation of said marker means to establish a first connection between a first one of said lines and first one of said trunks, and a second connection between a second one of said lines and a second one of said trunks; first and second apparatus in said marker means operated responsive to the placement of said first connection for respectively disconnecting said line from the associated ferrod and for connecting said link conductors to said trunk battery feed device, whereby said link conductors of said first connection through said network are conventionally polarized and said link conductors of said second connection through said network are inversely polarized for operating said ferrod, associated with said second one of said lines, upon the presence of a stuck contact between said links of said two connections, said common control means having additional stored program instructions, and means responsive to said instructions for reading out an operated ferrod condition from the associated one of said ferrods upon the occurrence of said condition in the matrix.